(12) United States Patent
Liau et al.

(10) Patent No.: US 11,555,784 B2
(45) Date of Patent: Jan. 17, 2023

(54) METHODS, SYSTEMS, AND DEVICES FOR SUPER RESOLUTION SOLID IMMERSION LENS MICROSCOPY

(71) Applicant: SuRe Optics, Inc., Chelmsford, MA (US)

(72) Inventors: Zong-Long Liau, Belmont, MA (US); Frederick J. Leonberger, Sarasota, FL (US)

(73) Assignee: SURE OPTICS, INC., Chelmsford, MA (US)

( * ) Notice: Subject to any disclaimer, the term of this patent is extended or adjusted under 35 U.S.C. 154(b) by 102 days.

(21) Appl. No.: 16/325,289

(22) PCT Filed: Aug. 18, 2017

(86) PCT No.: PCT/US2017/047533
§ 371 (c)(1),
(2) Date: Feb. 13, 2019

(87) PCT Pub. No.: WO2018/035422
PCT Pub. Date: Feb. 22, 2018

(65) Prior Publication Data
US 2019/0170993 A1    Jun. 6, 2019

Related U.S. Application Data

(60) Provisional application No. 62/377,501, filed on Aug. 19, 2016.

(51) Int. Cl.
*G01N 21/64* (2006.01)
*G01B 21/00* (2006.01)
*G02B 21/00* (2006.01)

(52) U.S. Cl.
CPC ...... *G01N 21/6458* (2013.01); *G02B 21/0032* (2013.01); *G02B 21/0076* (2013.01); *G02B 21/0024* (2013.01)

(58) Field of Classification Search
CPC ........... G01N 21/6458; G02B 21/0032; G02B 21/0076; G02B 21/0024
See application file for complete search history.

(56) References Cited

U.S. PATENT DOCUMENTS

| | | |
|---|---|---|
| 6,181,478 B1 | 1/2001 | Mandella |
| 6,683,724 B2 | 1/2004 | Patton et al. |

(Continued)

FOREIGN PATENT DOCUMENTS

WO    WO-2011/066266 A2    6/2011

OTHER PUBLICATIONS

Fletcher, D. A. et al., Near-field infrared imaging with a microfabricated solid immersion lens, Applied Physics Letters, 77(14):2109-2111 (2000).

(Continued)

*Primary Examiner* — Violeta A Prieto
(74) *Attorney, Agent, or Firm* — Rauschenbach Patent Law Group, LLC; Kurt Rauschenbach

(57) ABSTRACT

Described herein are methods and systems for the optical imaging of a physical specimen of interest that is in contact with, or in close proximity to, the backplane of a high refractive index solid-immersion lens (SIL), wherein the specimen comprises features of interest that act as a local high-refractive index regions. The SIL lens preferably comprises fiducial markers.

20 Claims, 10 Drawing Sheets

(56) References Cited

U.S. PATENT DOCUMENTS

| | | | | |
|---|---|---|---|---|
| 8,325,420 | B2* | 12/2012 | Liau | G11B 7/1374 |
| | | | | 359/661 |
| 9,304,308 | B2* | 4/2016 | Goruganthu | G02B 21/0032 |
| 2003/0231400 | A1 | 12/2003 | Frosig et al. | |
| 2011/0122498 | A1* | 5/2011 | Liau | B29D 11/00394 |
| | | | | 359/619 |
| 2011/0134520 | A1* | 6/2011 | Goruganthu | G02F 1/093 |
| | | | | 359/386 |
| 2012/0320455 | A1* | 12/2012 | Goruganthu | G01N 21/47 |
| | | | | 359/386 |
| 2016/0320628 | A1* | 11/2016 | Leonberger | B01L 3/5085 |

OTHER PUBLICATIONS

International Search Report, PCT/US2017/047533 (Methods, Systems, and Devices for Super Resolution Solid Immersion Lens Microscopy, filed Aug. 18, 2017), issued by ISA/European Patent Office, 5 pages, Jan. 8, 2018.

Koyama, K. et al., High collection efficiency in fluorescence microscopy with a solid immersion lens, Applied Physics Letters, 75(12):1667-1669 (1999).

Mansfield, S. M. and Kino, G. S., Solid immersion microscope, Applied Physics Letters, 57(24):2615-2616 (1990).

Written Opinion, PCT/US2017/047533 (Methods, Systems, and Devices for Super Resolution Solid Immersion Lens Microscopy, filed Aug. 18, 2017), issued by ISA/European Patent Office, 11 pages, Jan. 8, 2018.

Yoshita, M. et al., Improved High Collection Efficiency in Fluorescence Microscopy with a Weierstrass-Sphere Solid Immersion Lens, Japanese Journal of Applied Physics, 41(2)(76):L858-L860 (2002).

"International Preliminary Report on Patentability" received for PCT Application Serial No. PCT/US2017/047533 dated Feb. 28, 2019, 13 pages.

* cited by examiner

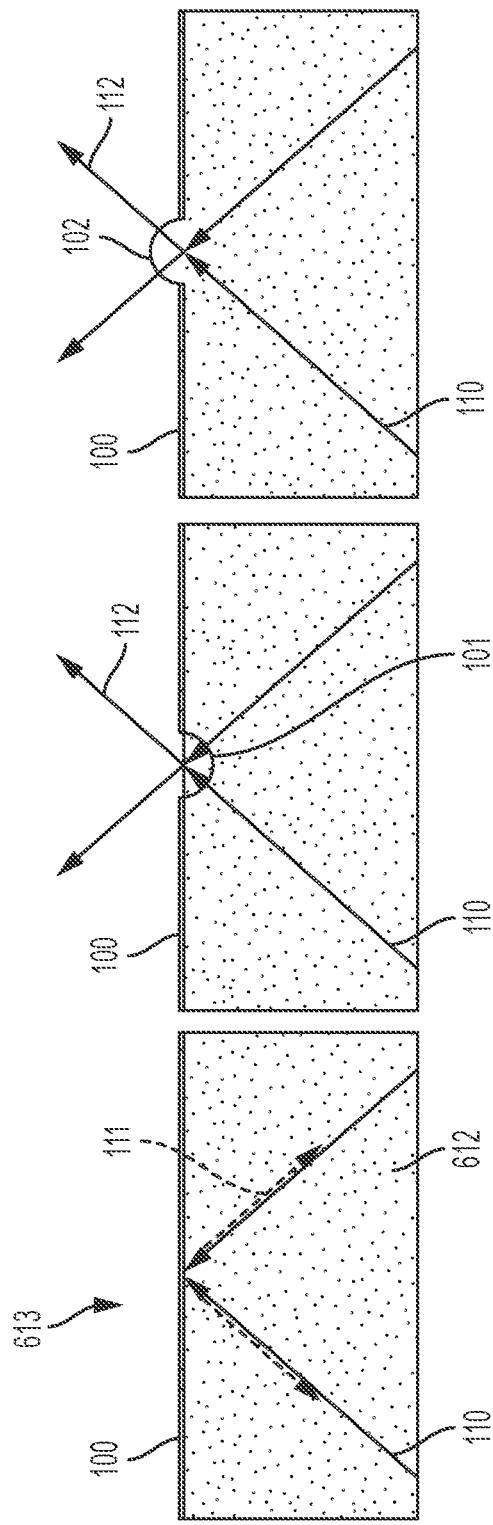

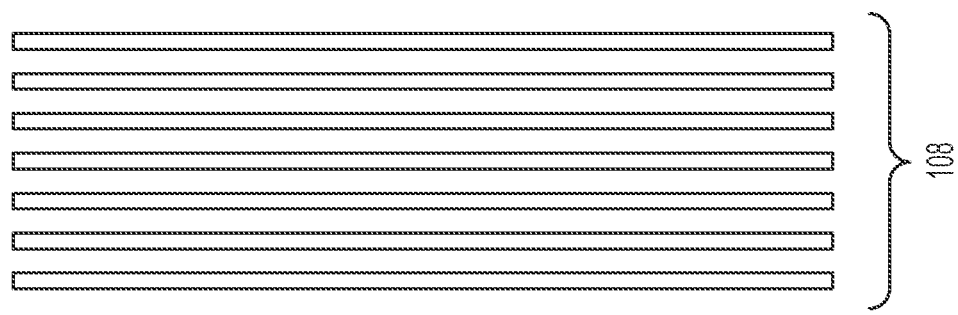
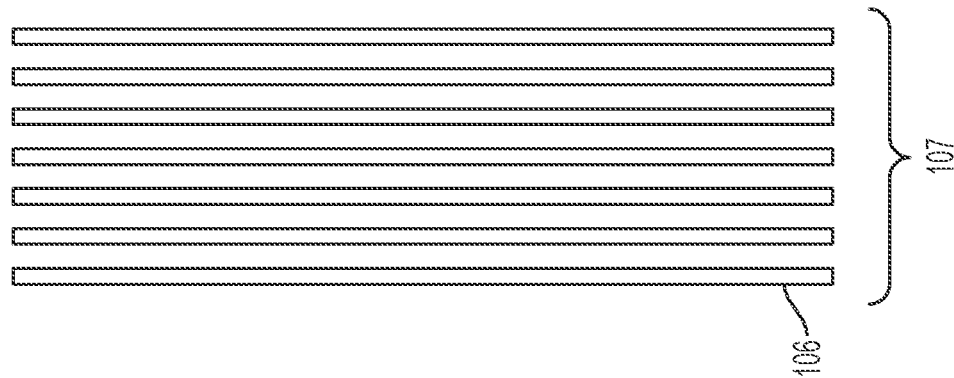
FIG. 6

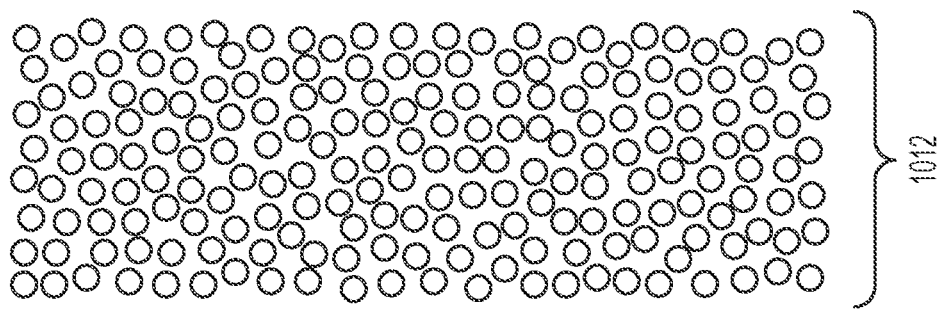
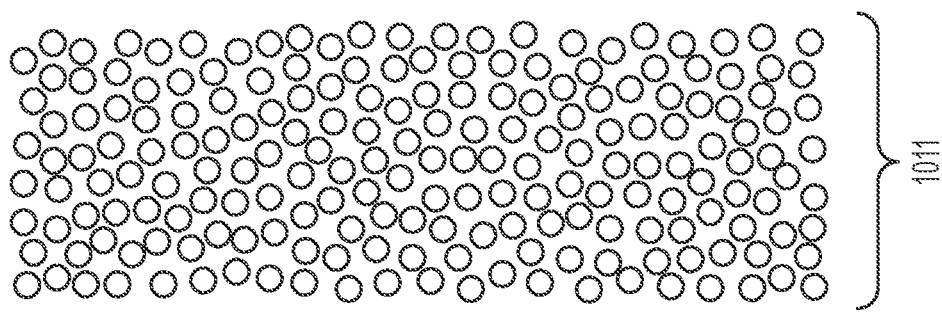
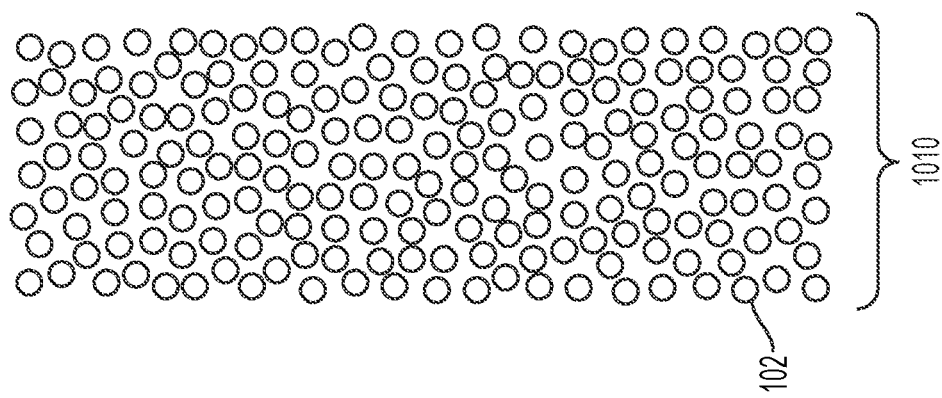
FIG. 7

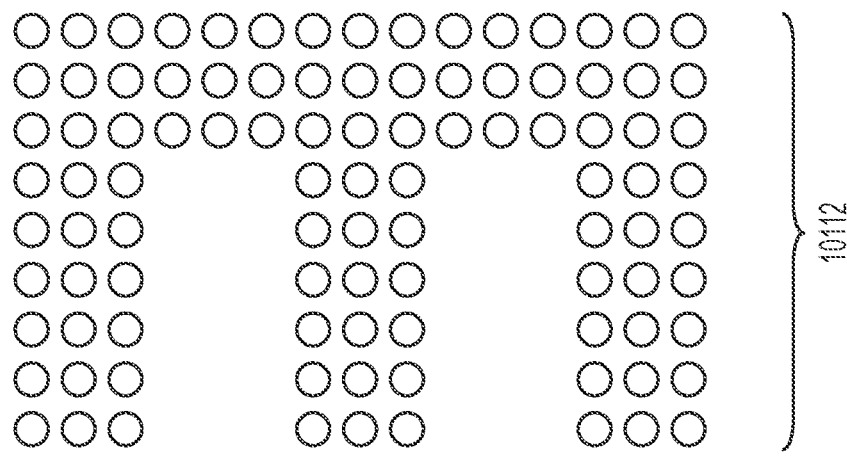
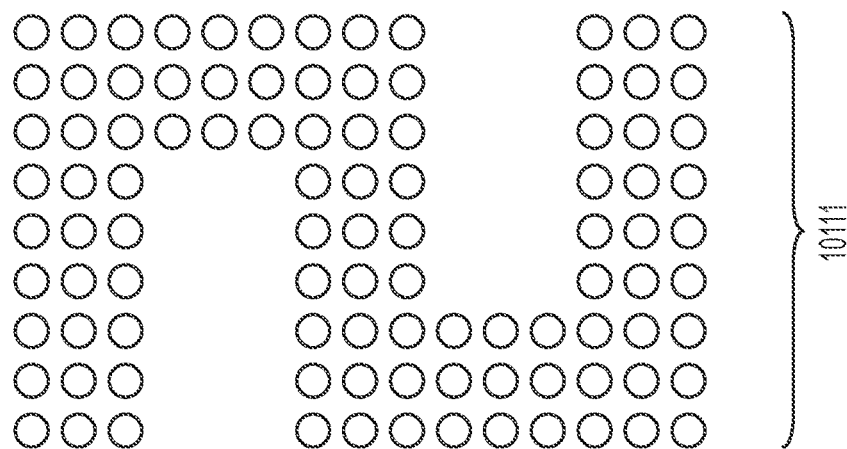
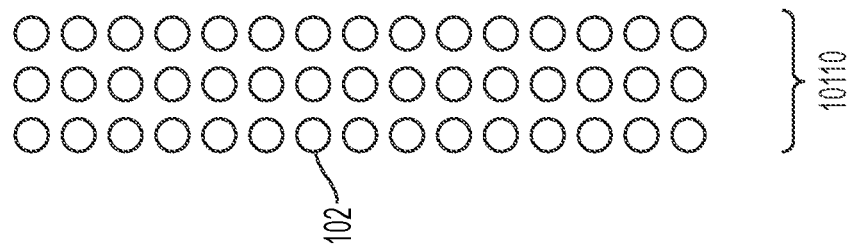
FIG. 11

METHODS, SYSTEMS, AND DEVICES FOR SUPER RESOLUTION SOLID IMMERSION LENS MICROSCOPY

CROSS REFERENCE TO RELATED APPLICATION

This application claims the benefit of U.S. Provisional Application No. 62/377,501, filed on Aug. 19, 2016, the content of which is hereby incorporated by reference in its entirety.

FIELD OF THE INVENTION

This invention relates generally to methods and systems for super-resolution light microscopy. More specifically, in certain embodiments, this invention relates to optical imaging of physical specimens with a high refractive index solid-immersion lens (SIL), wherein the specimen acts as a local high-refractive index region.

BACKGROUND OF THE INVENTION

Super-resolution microscopy encompasses methods of imaging that achieve limits of resolution surpassing the conventional diffraction limits defined by the wave nature of light. Super-resolution microscopy has great potential for a wide range of applications, especially in biological and biomedical fields. Several imaging methods have been developed to achieve super-resolutions, including: near field optical microscopy (NOM), which relies on a constricted aperture with a very small opening placed very close to the sample of interest; stimulated emission depletion (STED), which sharpens the excitation spot in fluorescent microscopy; structured illumination microscopy (SIM), which relies on the standing wave generated by two interfering laser beams; and stochastic optical reconstruction microscopy (STORM), which relies on excitation of a small subset of fluorophores at a time to avoid overlapping of diffraction spots. Such methods have led to limits of resolution of approximately 100 nm to 15 nm, which represent substantial improvement over the conventional diffraction limit of approximately 200 nm (with oil immersion).

Alternatively, high refractive index solid-immersion lenses (SIL) can be employed to achieve improved limits of resolution. The high index of the SIL effectively shortens the wavelength of the incident light used for observation, resulting in an increased numerical aperture and better resolution. The implementation of annular solid-immersion lenses (ASIL) further increases imaging capabilities, and pushes the resolution to a 70-nm limit set by diffraction theory.

SUMMARY OF THE INVENTION

The methods and systems described herein utilize an entirely different method made possible by the unique effects of light-transmission optics at the interface of the SIL backplane. Exploiting these transmission effects allows for limits of resolution in the nanometer to sub-nanometer range, and can also provide for super-resolution imaging of non-fluorescent specimens.

In particular, the methods and systems described herein relate to optical imaging of a physical specimen of interest that is in contact with or in close proximity to the backplane of a high refractive index solid-immersion lens (SIL), wherein the specimen comprises features of interest that act as a local high-refractive index regions. In certain embodiments, the SIL is designed such that only incident light which contacts the features of interest that act as local-high refractive index regions is transmitted through the SIL (e.g. due to scattering of the incident light by the features of interest), while any light which does not come into contact with the feature of interest is internally reflected. In some embodiments, the transmitted light may be detected directly or may be used to excite a fluorescent material for fluorescence microscopy. The method of using "transmission mode" microscopy through an SIL can be implemented in existing microscopy systems to achieve nanometer to sub-nanometer limits of resolution and can further facilitate super-resolution imaging of non-fluorescent specimens.

Thus, disclosed herein are methods and devices which allow for super-resolution imaging of a physical specimen of interest attached to the backplane of a high refractive index SIL. Embodiments described herein make use of a unique effect of light transmission optics through an interface between two media possessing different refractive indices. In a SIL, total internal reflection of focused light at the backplane can be overcome by the presence of a channel recess or bump on the surface of the backplane. The size of the channel or bump can be scaled down. This effect is useful for the sensitive detection of a very small specimen attached to the backplane, wherein the specimen represents a local region of high refractive index and is considered analogous to a bump on the surface of the backplane. Thus, in certain embodiments, only incident light which contacts the attached specimen is transmitted. This transmitted light can be directly detected by placing a light detector immediately following the specimen. In other embodiments, fluorescent material can by deposited on the backplane, such that the transmitted light generates fluorescence upon absorption by the deposited fluorescent material. This allows for detection as well as imaging.

In certain embodiments, the methods and systems disclosed herein allow for sub-nanometer resolution due to the dimensionless singular-point nature of the center of the spherical wave used as the excitation beam or observation beam. In certain embodiments, fiducial markings on the backside of the SIL in the form of, for example, deposited tracks of nanoparticles or etched surface features can be implemented. Such fiducial markings greatly enhance the imaging capabilities of the method or device by serving as a focusing reference, length scale, coordinate system, and/or address identification mechanism.

In one aspect, the invention is directed to a method of imaging a specimen containing features of interest using a solid immersion lens (SIL), the method comprising the steps of: (a) directing electromagnetic radiation (emr) (e.g., light, e.g., excitation light) to the SIL, wherein: (i) the SIL comprises a first surface comprising a convex region (e.g. as in a convex lens—curving outwards from the body of the SIL) (e.g., wherein the convex region makes up all or part of the first surface), and a second surface (e.g. a backplane) that is substantially planar; (ii) at least a portion of the emr is transmitted through the convex region of the first surface of the SIL, and propagates inside the SIL toward the second surface; (iii) the portion of the emr transmitted through the convex region forms a focus (e.g., wherein the focus is a 3D region) near and/or on the second surface of the SIL; and (iv) the second surface of the SIL is in contact with a sample medium having a refractive index that is lower than the refractive index of the SIL; (b) positioning a feature of interest of the specimen within the sample medium in close proximity to (e.g., in contact with, e.g., within 100 nm of, e.g. within one emr wavelength of) the second surface of the SIL, wherein the feature of interest has a refractive index that is higher than that of material immediately surrounding the feature of interest (e.g., the sample medium and/or other portions of the specimen immediately surrounding the feature of interest), and wherein the feature of interest is positioned within the focus formed by the emr, thereby illuminating the feature; and (c) detecting emr (e.g., emr having been scattered by the feature) that is either (i) transmitted from inside the SIL into the sample medium, or (ii) reflected from inside the SIL back toward the first surface of the SIL.

In certain embodiments, the feature of interest forms a local high-index region in close proximity to the second surface of the SIL. In certain embodiments, the feature of interest forms a local high-index region in close proximity to the second surface of the SIL, thereby increasing the amount of excitation light that is transmitted into the sample medium (e.g. thereby facilitating transmission). In certain embodiments, the feature of interest forms a local high-index region in close proximity to the second surface of the SIL, thereby acting as a source of a spherical wave with a well-defined center (e.g. an approximately spherical wave). In certain embodiments, the well-defined center of the spherical wave is a dimensionless singular point. In certain embodiments, the feature of interest comprises an absorption band that overlaps with the excitation wavelength (e.g. the excitation wavelength is within 1 full-width half-max of the center of the absorption band) such that strong dispersion about the absorption bands causes the feature of interest to have a high refractive index. In certain embodiments, the feature of interest corresponds to a region of compact chemical bonding and a high concentration of atoms within the specimen.

In certain embodiments, the refractive index of the feature of interest is a function of the geometry of the feature of interest and a region immediately surrounding the feature of interest (e.g., the sample medium and/or other portions of the specimen immediately surrounding the feature of interest). In certain embodiments, the refractive index of the feature of interest is greater than 1.45 (e.g. has a refractive index greater than that of glass). In certain embodiments, the refractive index contrast between the feature of interest and the material immediately surrounding the feature of interest (e.g., the sample medium and/or other portions of the specimen immediately surrounding the feature of interest) is no less than 0.22 (e.g., no less than 0.10, e.g., no less than 0.15, e.g., no less than 0.20, e.g., from 0.2 to 0.7, e.g., from 0.3 to 0.6, e.g., about 0.5).

In certain embodiments, the specimen is a biological specimen. In certain embodiments, the specimen comprises DNA. In certain embodiments, the specimen comprises a carbon nanotube. In certain embodiments, the specimen comprises a lipid membrane. In certain embodiments, the specimen is a vesicle.

In certain embodiments, the feature of interest is in contact with the second surface of the SIL. In certain embodiments, the feature of interest is within 100 nm of the second surface of the SIL. In certain embodiments, the distance between the feature of interest and the second surface of the SIL is no greater than $\lambda$ (e.g., no greater than $\lambda/10$, e.g. no greater than $\lambda/100$), wherein $\lambda$ is the wavelength of the excitation light.

In certain embodiments, the portion of the emr that is transmitted through the convex region of the first surface of the SIL is incident onto the second surface of the SIL at angles above the critical angle, such that in the absence of the feature of interest in close proximity to the second surface of the SIL, no excitation light is transmitted into the sample medium (e.g. the excitation light undergoes total internal reflection at the second surface of the SIL).

In certain embodiments, the emr is UV light (e.g. light having a wavelength of 300 nm-400 nm), visible light (e.g. light having a wavelength of 400 nm-800 nm), or infrared light (e.g. light having a wavelength of 800 nm-5000 nm). In certain embodiments, the emr is infrared light (e.g. light having a wavelength of 800 nm-5000 nm) to the SIL, the emr is detected using an infrared detector that converts the detected emr into a signal having a value that is a function of an intensity of the detected emr (e.g. an electronic signal having a value (e.g. a voltage, a current) that is proportional to an intensity of the detected emr), and the method comprises displaying the value of the signal for visualization (e.g. as a point in an image on a monitor).

In certain embodiments, the SIL is an annular SIL (e.g., wherein the SIL comprises a third surface that prevents the passage of light therethrough). In certain embodiments, the SIL has a refractive index greater than 3. In certain embodiments, the SIL comprises at least one member selected from the group consisting of Ge, InAs, GaSb, GaN, ZnS, ZnO, GaP, Si, and GaAs (e.g., wherein the SIL consists essentially of at least one member selected from the group consisting of Ge, InAs, GaSb, GaN, ZnS, ZnO, GaP, Si, and GaAs). In certain embodiments, the SIL comprises GaP.

In certain embodiments, the refractive index contrast between the SIL and the sample medium is no less than 0.22 (e.g. the refractive index contrast between the SIL and the sample medium is greater than that between glass and water) (e.g., no less than 0.5, e.g., no less than 0.75, e.g., no less than 1.5, e.g., from 0.5 to 2, e.g., from 0.5 to 1.5, e.g., about 1.5). In certain embodiments, the sample medium is a medium selected from the group consisting of air, water, organic material (e.g. an organic solvent) and a biological media (e.g. PBS, cell culture media, microscope sample mounting media (e.g. resin-based media, glycerol, glycerol jelly)). In certain embodiments, the sample medium has a refractive index selected from the group consisting of about 1, about 1.33, and about 1.5.

In certain embodiments, the second surface of the SIL comprises one or more fiducial markings. In certain embodiments, the fiducial markings are etched into the second surface of the SIL (e.g. as fine lines, e.g. as dotted lines, e.g. using EBL or FIB). In certain embodiments, the fiducial markings comprise a plurality of nanoparticles (e.g. nanoparticles such as gold nanoparticles, glass nanoparticles nanoparticles, plastic beads, quantum dots (e.g. ZnSe quantum dots, e.g. CdSe quantum dots). In certain embodiments, each of the fiducial markings of the one or more fiducial markings is a single nanoparticle. In certain embodiments, at least one of the fiducial markings of the one or more fiducial markings is a single nanoparticle. In certain embodiments, the fiducial markings comprise carbon nanoparticles (e.g. carbon nanoparticles deposited via laser ablation). In certain embodiments, the fiducial markings comprise a patterned organic layer that has been carbonized (e.g. the patterned organic layer is carbonized via laser ablation). In certain embodiments, the fiducial markings are fabricated via ion implantation. In certain embodiments, the fiducial markings comprise one or more defects near the second surface of the SIL, the one or more defects selected from the group consisting of microscopic disorder, stress, bubbles, and blisters (e.g. defects are produced near the second surface of the SIL via ion implantation). In certain embodiments, the fiducial markings comprise one or more bubbles near the second surface of the SIL.

In certain embodiments, the method comprises imaging the specimen at a resolution at least as fine as or finer than 100 nm (e.g. finer than 70 nm, e.g. finer than 10 nm, e.g. finer than 1 nm) (e.g. two features of interest separated that are separated by 100 nm or less can be resolved as separate features (e.g. distinguished from each other)). In certain embodiments, the method comprises imaging the specimen at a resolution at least as fine as or finer than (e.g., no larger than) $1.22\lambda/n$, wherein $\lambda$ is the wavelength of the excitation light, and n is the refractive index of the sample medium (e.g. two features of interest separated that are separated by less than $1.22\lambda/n$ can be resolved as separate features (e.g. distinguished from each other), e.g. the resolution is better than the conventional Rayleigh limit for imaging in a homogeneous medium with the same refractive index as the sample medium). In certain embodiments, the method comprises imaging the specimen at a resolution no larger than $1.22\lambda/n$, wherein $\lambda$ is the wavelength of the excitation light, and n is the refractive index of the SIL (e.g. two features of interest separated that are separated by less than $1.22\lambda/n$ can be resolved as separate features (e.g. distinguished from each other), e.g. the resolution is better than the conventional Rayleigh limit for imaging in a homogeneous medium with the same refractive index as the SIL).

In certain embodiments, the method comprises positioning the SIL and sample medium in a scanning confocal microscope; and directing emr to the SIL using an objective lens of the scanning confocal microscope.

In certain embodiments, the method comprises detecting emr (e.g. emr having been scattered by the feature) that is transmitted through the sample medium and/or specimen, away from the second surface (e.g. the backplane) of the SIL. In certain embodiments, the emr (e.g. emr having been scattered by the feature) that is transmitted through the sample medium and/or specimen, away from the second surface (e.g. the backplane) of the SIL is detected with a detector mounted immediately following the sample medium and/or specimen (e.g. the sample medium and/or specimen is in between the second surface of the SIL and the detector, e.g. there are no lenses in between the sample medium and/or specimen and the detector, e.g. there are no optical elements in between the sample medium and/or specimen and the detector).

In another aspect, the invention is directed to a method of imaging a specimen containing features of interest using a solid immersion lens (SIL), the method comprising the steps of: (a) directing electromagnetic radiation (emr) (e.g., light, e.g., excitation light) to the SIL, wherein: (i) the SIL comprises a first surface comprising a convex region (e.g. as in a convex lens—curving outwards from the body of the SIL) (e.g., wherein the convex region makes up all or part of the first surface), and a second surface (e.g. a backplane) that is substantially planar; (ii) at least a portion of the emr is transmitted through the convex region of the first surface of the SIL, and propagates inside the SIL toward the second surface; (iii) the portion of the emr transmitted through the convex region forms a focus (e.g., wherein the focus is a 3D region) near and/or on the second surface of the SIL; and (iii) the second surface of the SIL is in contact with a sample medium having a refractive index that is lower than the refractive index of the SIL; (b) positioning specimen feature of interest of the specimen within the sample medium in close proximity to (e.g., in contact with, e.g., within 100 nm of, e.g. within one emr wavelength of) the second surface of the SIL, wherein the feature of interest has a refractive index that is higher than that of material immediately surrounding the feature of interest (e.g., the sample medium and/or other portions of the specimen immediately surrounding the feature of interest), and wherein the feature of interest is positioned within the focus formed by the emr, thereby illuminating the specimen; and (c) detecting fluorescent light that is emitted by at least one of (i) the feature of interest itself, and (ii) one or more secondary fluorescent objects (e.g. individual fluorophores, quantum dots, one or more nanoparticles, each of which comprises multiple individual fluorophores or quantum dots) within the sample medium.

In certain embodiments, the method comprises detecting fluorescent light that is emitted by one or more secondary fluorescent objects. In certain embodiments, the secondary fluorescent objects are excited by excitation light that is transmitted into the sample medium. In certain embodiments, the feature of interest forms a local high-index region in close proximity to the second surface of the SIL, thereby increasing the amount of excitation light that is transmitted into the sample medium (e.g. thereby facilitating transmission), and the secondary fluorescent objects are excited by excitation light that is transmitted into the sample medium. In certain embodiments, the secondary fluorescent objects are in close proximity to the feature of interest (e.g. a distance of no greater than 10 nm, e.g. a distance of no greater than 100 nm, e.g. a distance of no greater than $\lambda/100$, e.g. a distance of no greater than $\lambda/10$, e.g. a distance of no greater than $\lambda$).

In certain embodiments, fluorescent light that is emitted by at least one of (i) the feature of interest itself, and (ii) one or more secondary fluorescent objects in close proximity to the feature of interest (e.g. a separation of less than 100 nm, e.g. a separation of less than 20 nm, e.g. a separation of less than 5 nm, e.g. a separation of less than 1 nm) is detected by a detector following the sample medium (e.g. a detector that detects transmitted electromagnetic radiation). In certain embodiments, fluorescent light that is emitted by at least one of (i) the feature of interest itself, and (ii) one or more secondary fluorescent objects in close proximity to the feature of interest (e.g. a separation of less than 100 nm, e.g. a separation of less than 20 nm, e.g. a separation of less than 5 nm, e.g. a separation of less than 1 nm) is transmitted from the sample medium into the SIL, and detected after it propagates inside the SIL and is transmitted through the first surface of the SIL. In certain embodiments, the emr that illuminates the feature of interest is infrared light (e.g. 800 nm-5000 nm), and the fluorescent light is visible light (e.g. 400 nm-800 nm).

In certain embodiments, the feature of interest forms a local high-index region in close proximity to the second surface of the SIL. In certain embodiments, the feature of interest forms a local high-index region in close proximity to the second surface of the SIL, thereby increasing the amount of excitation light that is transmitted into the sample medium (e.g. thereby facilitating transmission). In certain embodiments, the feature of interest forms a local high-index region in close proximity to the second surface of the SIL, thereby acting as a source of a spherical wave with a well-defined center (e.g. an approximately spherical wave). In certain embodiments, the well-defined center of the spherical wave is a dimensionless singular point. In certain embodiments, the feature of interest comprises an absorption band that overlaps with the excitation wavelength (e.g. the excitation wavelength is within 1 full-width half-max of the center of the absorption band) such that strong dispersion about the absorption bands causes the feature of interest to have a high refractive index. In certain embodiments, the feature of interest corresponds to a region of compact chemical bonding and a high concentration of atoms within the specimen.

In certain embodiments, the refractive index of the feature of interest is a function of the geometry of the feature of interest and a region immediately surrounding the feature of interest (e.g., the sample medium and/or other portions of the specimen immediately surrounding the feature of interest). In certain embodiments, the refractive index of the feature of interest is greater than 1.45 (e.g. has a refractive index greater than that of glass).

In certain embodiments, the refractive index contrast between the feature of interest and the material immediately surrounding the feature of interest (e.g., the sample medium and/or other portions of the specimen immediately surrounding the feature of interest) is no less than 0.22 (e.g., no less than 0.10, e.g., no less than 0.15, e.g., no less than 0.20, e.g., from 0.2 to 0.7, e.g., from 0.3 to 0.6, e.g., about 0.5).

In certain embodiments, the specimen is a biological specimen. In certain embodiments, the specimen comprises DNA. In certain embodiments, the specimen comprises a carbon nanotube. In certain embodiments, the specimen comprises a lipid membrane. In certain embodiments, the specimen comprises a vesicle.

In certain embodiments, the feature of interest is in contact with the second surface of the SIL. In certain embodiments, the feature of interest is within 100 nm of the second surface of the SIL. In certain embodiments, the distance between the feature of interest and the second surface of the SIL is no greater than $\lambda$ (e.g., no greater than $\lambda/10$, no greater than $\lambda/100$), wherein $\lambda$ is the wavelength of the excitation light.

In certain embodiments, the portion of the excitation light that is transmitted through the convex region of the first surface of the SIL is incident onto the second surface of the SIL at angles above the critical angle, such that in the absence of the feature of interest in close proximity to the second surface of the SIL, no excitation light is transmitted into the sample medium (e.g. the excitation light undergoes total internal reflection at the second surface of the SIL).

In certain embodiments, the excitation light is UV light (e.g. 300 nm-400 nm), visible light (e.g. 400 nm-800 nm), or infrared light (e.g. 800 nm-5000 nm). In certain embodiments, the emr is infrared light (e.g. light having a wavelength of 800 nm-5000 nm) to the SIL, the emr is detected using an infrared detector that converts the detected emr into a signal having a value that is a function of an intensity of the detected emr (e.g. an electronic signal having a value (e.g. a voltage, a current) that is proportional to an intensity of the detected emr), and the method comprises displaying the value of the signal for visualization (e.g. as a point in an image on a monitor).

In certain embodiments, the SIL is an annular SIL (e.g., wherein the SIL comprises a third surface that prevents the passage of light therethrough).

In certain embodiments, the SIL has a refractive index greater than 3. In certain embodiments, the SIL comprises at least one member selected from the group consisting of Ge, InAs, GaSb, GaN, ZnS, ZnO, GaP, Si, and GaAs (e.g., wherein the SIL consists essentially of at least one member selected from the group consisting of Ge, InAs, GaSb, GaN, ZnS, ZnO, GaP, Si, and GaAs). In certain embodiments, the SIL comprises GaP.

In certain embodiments, the refractive index contrast between the SIL and the sample medium is no less than 0.22 (e.g. the refractive index contrast between the SIL and the sample medium is greater than that between glass and water) (e.g., no less than 0.5, e.g., no less than 0.75, e.g., no less than 1.5, e.g., from 0.5 to 2, e.g., from 0.5 to 1.5, e.g., about 1.5).

In certain embodiments, the sample medium is a medium selected from the group consisting of air, water, organic material (e.g. an organic solvent), and a biological media (e.g. PBS, cell culture media, microscope sample mounting media (e.g. resin-based media, glycerol, glycerol jelly)). In certain embodiments, the sample medium has a refractive index selected from the group consisting of about 1, about 1.33, and about 1.5.

In certain embodiments, the second surface of the SIL comprises one or more fiducial markings. In certain embodiments, the fiducial markings are etched into the second surface of the SIL (e.g. as fine lines, e.g. as dotted lines, e.g. using EBL or FIB). In certain embodiments, the fiducial markings comprise a plurality of nanoparticles (e.g. nanoparticles such as gold nanoparticles, glass nanoparticles nanoparticles, plastic beads, quantum dots (e.g. ZnSe quantum dots, e.g. CdSe quantum dots)). In certain embodiments, each of the fiducial markings of the one or more fiducial markings is a single nanoparticle. In certain embodiments, at least one of the fiducial markings of the one or more fiducial markings is a single nanoparticle. In certain embodiments, the fiducial markings comprise carbon nanoparticles (e.g. carbon nanoparticles deposited via laser ablation). In certain embodiments, the fiducial markings comprise a patterned organic layer that has been carbonized (e.g. the patterned organic layer is carbonized via laser ablation). In certain embodiments, the fiducial markings are fabricated via ion implantation. In certain embodiments, the fiducial markings comprise one or more defects near the second surface of the SIL, the one or more defects selected from the group consisting of microscopic disorder, stress, bubbles, and blisters (e.g. defects are produced near the second surface of the SIL via ion implantation). In certain embodiments, the fiducial markings comprise one or more bubbles near the second surface of the SIL.

In certain embodiments, the method comprises imaging the specimen at a resolution at least as fine as or finer than 100 nm (e.g. finer than 70 nm, e.g. finer than 10 nm, e.g. finer than 1 nm) (e.g. two features of interest separated that are separated by less than 100 nm can be resolved as separate features (e.g. distinguished from each other)). In certain embodiments, the method comprises imaging the specimen at a resolution at least as fine as (no larger than) $0.622\lambda/n$, wherein $\lambda$ is the wavelength of the excitation light, and n is the refractive index of the sample medium (e.g. two features of interest separated that are separated by less than $1.22\lambda/n$ can be resolved as separate features (e.g. distinguished from each other), e.g. the resolution is better than the conventional Rayleigh limit for imaging in a homogeneous medium with the same refractive index as the sample medium). In certain embodiments, the method comprises imaging the specimen at a resolution no larger than $0.622\lambda/n$, wherein $\lambda$ is the wavelength of the excitation light, and n is the refractive index of the SIL (e.g. two features of interest separated that are separated by less than $1.22\lambda/n$ can be resolved as separate features (e.g. distinguished from each other), e.g. the resolution is better than the conventional Rayleigh limit for imaging in a homogeneous medium with the same refractive index as the SIL).

In certain embodiments, the method comprises positioning the SIL and sample medium in a scanning confocal microscope; and directing emr to the SIL using an objective lens of the scanning confocal microscope.

In certain embodiments, the method comprises detecting fluorescent light that is transmitted through the sample medium and/or specimen, away from the second surface (e.g. the backplane) of the SIL. In certain embodiments, the fluorescent light that is transmitted through the sample medium and/or specimen, away from the second surface (e.g. the backplane) of the SIL is detected with a detector mounted immediately following the sample medium and/or specimen (e.g. the sample medium and/or specimen is in between the second surface of the SIL and the detector, e.g. there are no lenses in between the sample medium and/or specimen and the detector).

In another aspect, the invention is directed to a system for imaging a specimen containing features of interest using a solid immersion lens (SIL), the system comprising: a source of electromagnetic radiation (emr) (e.g., light, e.g., excitation light); a SIL in contact with a sample medium and positioned in close proximity to the specimen, the sample medium having a refractive index that is lower than the refractive index of the SIL, the SIL comprising: a first surface comprising a convex region (e.g. as in a convex lens—curving outwards from the body of the SIL) (e.g., wherein the convex region makes up all or part of the first surface), and a second surface (e.g. a backplane) that is substantially planar, wherein the second surface of the SIL is in contact with the sample medium, such that at least a portion of the emr from the source is transmitted through the convex region of the first surface of the SIL, and propagates inside the SIL toward the second surface, the portion of the emr transmitted through the convex region forms a focus (e.g., wherein the focus is a 3D region) near and/or on the second surface of the SIL, wherein a feature of interest of the specimen is in close proximity to (e.g., in contact with, e.g., within 100 nm of, e.g. within one emr wavelength of) the second surface of the SIL, wherein the feature of interest has a refractive index that is higher than that of the sample medium, and wherein the feature of interest is positioned within the focus formed by the emr, thereby illuminating the feature of interest; and a detector for detecting emr (e.g., light having been scattered by the feature of interest) that is either (i) transmitted from inside the SIL into the sample medium, or (ii) reflected from inside the SIL back toward the first surface of the SIL.

In certain embodiments, the SIL allows imaging the specimen at a resolution at least as fine as or finer than 100 nm (e.g. finer than 10 nm, e.g. finer than 1 nm)(e.g. two features of interest separated that are separated by less than 100 nm can be resolved as separate features (e.g. distinguished from each other)). In certain embodiments, the SIL allows imaging the specimen at a resolution at least as fine as or finer than $1.22\lambda/n$, wherein $\lambda$ is the wavelength of the excitation light, and n is the refractive index of the sample medium (two features of interest separated that are separated by less than $1.22\lambda/n$ can be resolved as separate features (e.g. distinguished from each other), e.g. the resolution is better than the conventional Rayleigh limit for imaging in a homogeneous medium with the same refractive index as the sample medium). In certain embodiments, the SIL allows imaging the specimen at a resolution at least as fine as or finer than $1.22\lambda/n$, wherein $\lambda$ is the wavelength of the excitation light, and n is the refractive index of the SIL (e.g. two features of interest separated that are separated by less than $1.22\lambda/n$ can be resolved as separate features (e.g. distinguished from each other), e.g. the resolution is better than the conventional Rayleigh limit for imaging in a homogeneous medium with the same refractive index as the SIL).

In certain embodiments, the source, SIL, and detector are part of a scanning confocal microscope. In certain embodiments, the detector is mounted immediately following the specimen and sample medium.

In another aspect, the invention is directed to a device comprising a solid immersion lens (SIL), wherein the SIL comprises: a first surface comprising a convex region (e.g. as in a convex lens—curving outwards from the body of the SIL) (e.g., wherein the convex region makes up all or part of the first surface); and a second surface (e.g. a backplane) that is substantially planar, the second surface comprising one or more fiducial markings.

In certain embodiments, the fiducial markings are etched into the second surface of the SIL (e.g. as fine lines, e.g. as dotted lines, e.g. using EBL or FIB). In certain embodiments, the fiducial markings comprise a plurality of nanoparticles (e.g. nanoparticles such as gold nanoparticles, glass nanoparticles, plastic beads, quantum dots (e.g. ZnSe quantum dots, CdSe quantum dots)). In certain embodiments, each of the fiducial markings of the one or more fiducial markings is a single nanoparticle. In certain embodiments, at least one of the fiducial markings of the one or more fiducial markings is a single nanoparticle. In certain embodiments, the fiducial markings comprise carbon nanoparticles (e.g. carbon nanoparticles deposited via laser ablation). In certain embodiments, the fiducial markings comprise a patterned organic layer that has been carbonized (e.g. the patterned organic layer is carbonized via laser ablation). In certain embodiments, the fiducial markings are fabricated via ion implantation. In certain embodiments, the fiducial markings comprise one or more defects near the second surface of the SIL, the one or more defects selected from the group consisting of microscopic disorder, stress, bubbles, and blisters (e.g. defects are produced near the second surface of the SIL via ion implantation). In certain embodiments, the fiducial markings comprise one or more bubbles near the second surface of the SIL.

In another aspect, the invention is directed to a method of imaging an specimen using an annular solid immersion lens (SIL), the method comprising imaging the specimen at a resolution at least as fine as or finer than 10 nm (e.g. at least as fine as or finer than 1 nm) (e.g. two features of interest separated that are separated by less than 10 nm can be resolved as separate features (e.g. distinguished from each other)).

Embodiments described with respect to one aspect of the invention may be, applied to another aspect of the invention (e.g., features of embodiments described with respect to one independent claim are contemplated to be applicable to other embodiments of other independent claims).

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 1 is a schematic showing the total internal reflection of focused light at a backplane of a SIL according to an illustrative embodiment.

FIG. 2 is a schematic showing the transmission of focused light through a channel recess in the backplane according to an illustrative embodiment.

FIG. 3 is a schematic showing the transmission of focused light through a bump in the backplane according to an illustrative embodiment.

FIG. 6 is a schematic showing fiducial markings made of etched micro-channel recesses in the backplane of the SIL according to an illustrative embodiment.

FIG. 7 is a schematic showing fiducial markings made of nanoparticles deposited on the backplane of the SIL according to an illustrative embodiment.

FIG. 11 is a schematic showing number markings made of nanoparticles deposited on the backplane of the SIL according to an illustrative embodiment.

DETAILED DESCRIPTION

Figure 4:
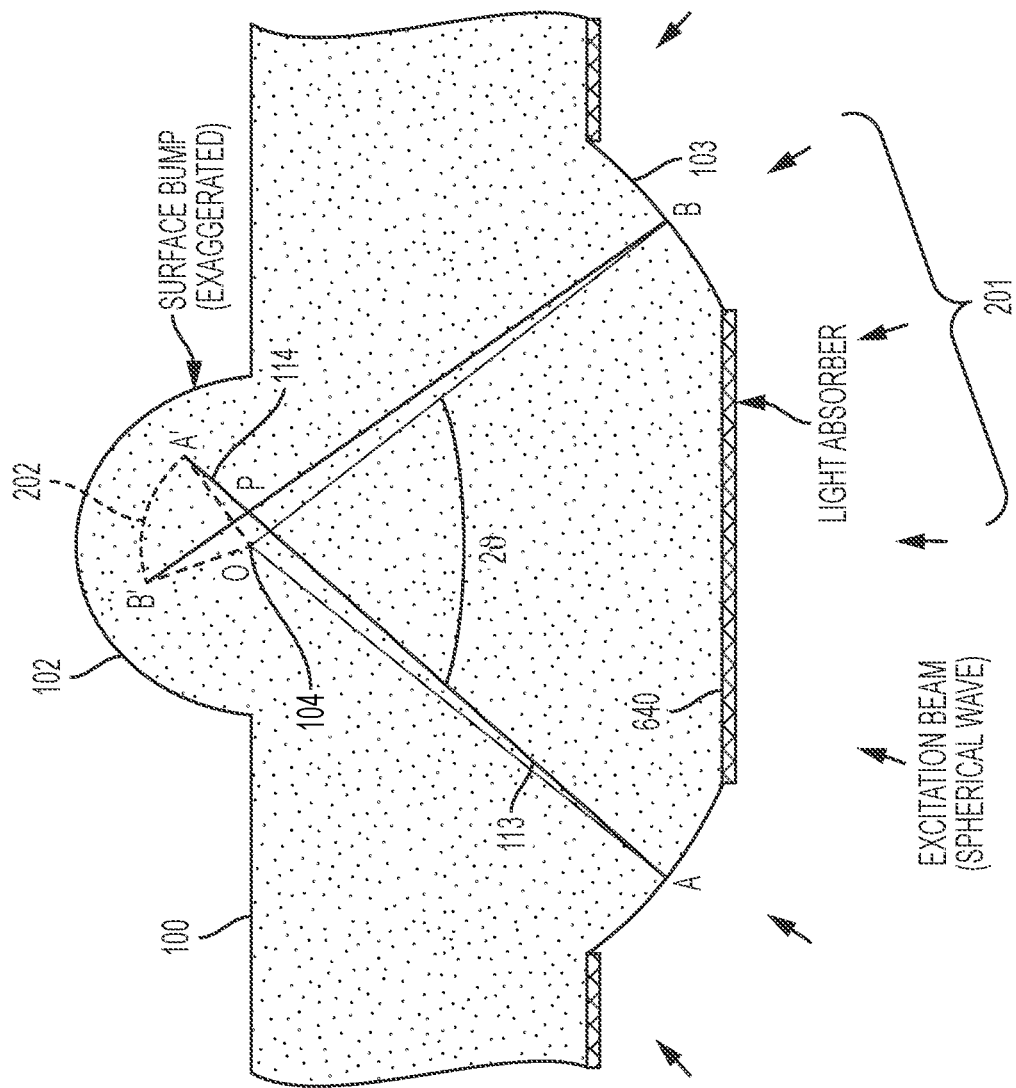
FIG. 4 is a schematic showing the diffractive propagation of the focused light in the SIL, showing that the spherical-wave nature of the light is maintained with a well-defined center of curvature according to an illustrative embodiment.

It is contemplated that systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Most super-resolution microscopy techniques rely on fluorescence, and often require sophisticated and specialized fluorophores and instrumentation, as well as time consuming sample preparation and imaging procedures. These limitations severely impede practical use of such super-resolution techniques. A simplified super-resolution microscopy method capable of imaging sub-100 nm specimens, including non-fluorescent specimens, would be a powerful tool for biomedical research and diagnosis.

Fiducial markings in super-resolution microscopy are also highly desirable. Fiducial markings may be intentionally added to a sample prior to observation in a microscope in order to serve as focusing references, scale markers, or coordinate systems. Clearly defined focusing references can unambiguously alert the user of a microscope as to whether the sample is in focus. Built-in scale marks can also provide absolute length reference independent from the calibration of the microscope. In certain embodiments, built-in coordinate marks allow a the location of a specimen or particular features of interest within the specimen to be precisely tracked by precisely addressing a lens within an array, enabling a definitive record of sample locations to be kept referencing the location of specimens within an array of lenses.

In certain embodiments, the methods and systems described herein are a type of super-resolution microscopy that provides for imaging of fluorescent or non-fluorescent specimens attached to the backplane of an SIL at resolutions near and at sub-nanometer length scales. The phrase "attached to" the backplane, as used throughout this specification, can mean in physical contact with, deposited on, or in close proximity to the backplane. In some embodiments, the methods and systems further allows for the optional implementation of useful fiducial markings in the backplane of the SIL.

FIG. 1 illustrates electromagnetic radiation 110 focused near the backplane 100 of the SIL (FIG. 1 shows only the region near the backplane; the entire SIL is shown in FIG. 4). In the SIL, the focused electromagnetic radiation 110 can be thought of as converging rays. The backplane 100 of the SIL represents an interface between the high-index SIL material 612 and the sample medium 613 in contact with the other surface of the backplane (which may be, for example, air or water, or a biological specimen). As described by optical theory, electromagnetic radiation 110 which contacts the interface is completely reflected 111 back into the SIL material if the angle of incidence exceeds some critical value (e.g. the critical angle). Large refractive index differences between the two media on either side of the interface (e.g., the SIL material 612 and a sample medium 613 such as air) promote this total internal reflection. For example, in the case of a SIL made of gallium phosphide, GaP (refractive index of 3.4), and a low-index side of air (refractive index of ~1), the critical angle is 17°. In certain embodiments, the geometry of the SIL is tailored such that all focused electromagnetic radiation which propagates through the SIL is subject to total internal reflection at the backplane. For example, the SIL may be an annular SIL, as disclosed in U.S. Pat. No. 8,325,420, "Annular Solid Immersion Lenses and Methods of Making Them," issued Dec. 4, 2012, the entire contents of which is hereby incorporated by reference.

In certain embodiments, a portion of an annular SIL 103 is coated with an material 640 that prevents the passage of electromagnetic radiation (e.g. by absorbing or reflecting a large fraction of the incident electromagnetic radiation), as illustrated in FIG. 4, such that only large angle rays are allowed to enter the SIL.

In certain embodiments, as seen in FIG. 2, when a channel recess 101 is introduced into the high-index medium, transmission 112 becomes possible. Without wanting to be bound to any theory, this may be explained by optical theory, as, in certain embodiments, the focused rays 110 may become normally incident to the surface of the channel recess (e.g., the angle of incidence becomes 0 degrees—less than the critical angle required for reflection).

In certain embodiments, as illustrated in FIG. 3, transmission 112 can also be provided for by a bump 102 on the surface of the SIL backplane 100. Again, due to the curvature of the bump, all rays become normally incident at the surface of the bump. The bump 102 need not be the same material or have the same refractive index as the SIL. The bump 102 can represent, for example, any physical specimen of interest attached to the backplane 100 of the SIL, or a particular region of a specimen corresponding to a feature of interest. For example, the bump 102 may represent a cross section of a carbon nanotube deposited on the backplane 100 of the SIL.

FIG. 4 illustrates the case of an annular SIL (ASIL) 103 in a laser scanning microscope (LSM). A physical specimen of interest attached to the backplane 100 of the SIL 103 is modeled as a bump 102. The size of the bump is exaggerated for purposes of explanation. s A particular feature of interest within a specimen represent a localized region of high refractive index (relative to the low index media of, for example, air). The bump 102 can greatly facilitate transmission, since, as explained previously, the curvature of the bump causes all focused rays to become normally incident. This is valid for any arbitrary bump size. The bump can be scaled down until it reaches the size of a wavelength of electromagnetic radiation, where ray optics become invalid.

Although not described by conventional ray optics, specimens smaller than the incident wavelength of electromagnetic radiation can nevertheless facilitate the transmission of the focused electromagnetic radiation in the realm of wave optics (e.g. due to scattering) In certain embodiments, light may be transmitted through the backplane due to scattering induced by features of interest corresponding to local regions of high refractive index within the specimen. Referring still to FIG. 4, the excitation beam 201 is a spherical wave. The wave propagates diffractively and forms a diffraction pattern in the backplane 100 of the annular SIL 103, with a central lobe of approximately 100-nm as determined by the wavelength of electromagnetic radiation and index of refraction of the SIL. This diffraction-limited spot size does not limit the resolution of the method. The first point is that the wave fronts remain spherical with a singular center, as may be explained by considering the spherical-harmonics expansion of the incident wave.

In another embodiment FIG. 4 illustrates an optical-path length consideration that approximates this effect. For simplicity, and without loss of generality, the focal point of the excitation beam is chosen as the center of curvature 104, or point O, of the SIL 103. Two arbitrary points on the surface of the SIL, A and B, are considered such that AO=BO=the radius of curvature of the SIL. A point P, located at a small distance from O, is considered such that the subtended angles OAP and OBP are small and approximately equal. Since AP>BP, the diffracted wavelets arrive at P with a phase difference. In the continued propagation, wave front 202, or A'B', is formed with AA'=BB', such that the wavelets are in phase. It then follows that triangles AOA' and BOB' are congruent. This yields the conclusion that OA'=OB', which indicates that the wave front 202 has its center located at 104. Thus, the spherical wave is maintained, with the center still well defined. When O is centered to the bump, the refractive index profile matches the symmetry of the wave front. This sets up a resonant boundary condition which facilitates electromagnetic radiation transmission. The size of the bump can be scaled down to approach the atomic realm, as long as the effective symmetry holds.

Figure 5:
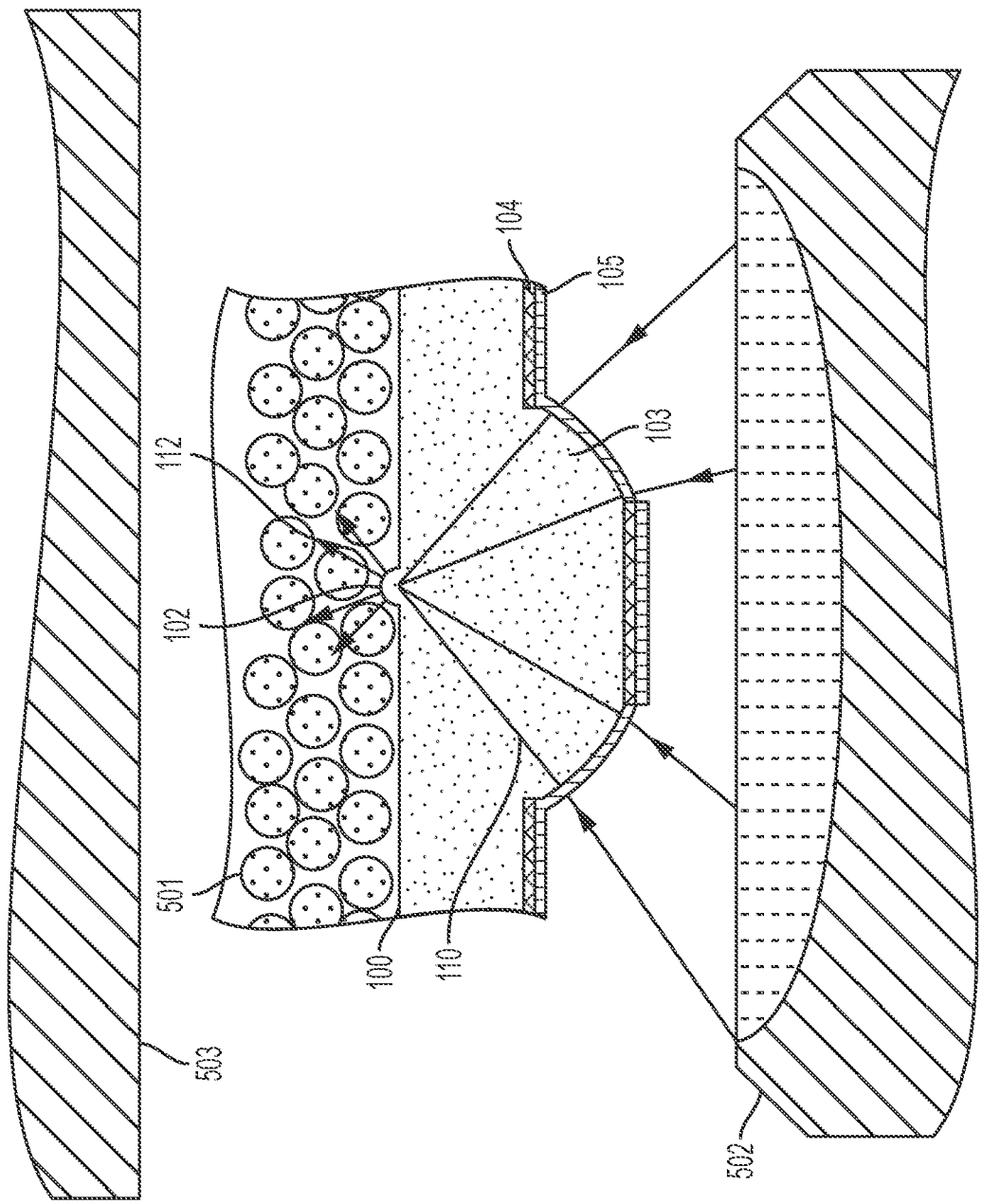
FIG. 5 is a diagram of the super-resolution imaging method and apparatus, in which the specimen of interest is modeled as a surface bump according to an illustrative embodiment.

Referring now to FIG. 5, in an embodiment, the electromagnetic radiation transmission provided for by the physical specimen of interest attached to the backplane, as modeled by a bump 102, can be imaged in a LSM 502. In certain embodiments, fluorescent material 501 is deposited onto the backplane of the SIL 103. The transmitted electromagnetic radiation excites the fluorescent material 501, and the fluorescence is detected and used in the LSM imaging. For example, the specimen, or the features of interest the specimen contains may not be fluorescent themselves, however a fluorescence signal from one or more secondary fluorescent objects (e.g. individual fluorophores, quantum dots, one or more nanoparticles, each of which comprises multiple individual fluorophores or quantum dots) that are attached to the specimen or in close proximity to the feature of interest is detected in order to form an image. In certain embodiments, with the center of the spherical wave being a dimensionless singular point, this method allows sub-nanometer resolution, as has been experimentally observed in imaging with an annular SIL incorporated into a LSM.

The dimensionless singular point is fundamentally different from the small wavelengths of the conventional fine probes such as x-ray and electrons, and can, in principle, allow for infinitesimally small limits of resolution. Further, the resolution power is, in principle, independent of wavelength. This is advantageous since longer wavelengths are less harmful to biological specimens. In certain embodiments, the excitation beam or incident beam consists of infrared wavelengths. The utilization of longer wavelengths for probing also allows for the use of silicon as a SIL material. The use of silicon is advantageous due to its high refractive index, low material cost, and compatibility with advanced fabrication technology. Further, since the specimen itself triggers transmission, the method allows for efficient fluorescence imaging while minimizing amount of electromagnetic radiation that illuminates the specimen, thereby reducing the potential for damage to biological specimens caused by illumination. In certain embodiments, reducing the amount of illuminating electromagnetic radiation also reduces fluorophore bleaching.

Referring still to FIG. 5, in some embodiments, the specimen of interest 102 is non-fluorescent. The transmission of electromagnetic radiation into the sample medium that is provided for by attachment of the specimen of interest 102 to the backplane 100 causes excitation of the fluorescent material 501 deposited on the backplane. This allows for fluorescence imaging of non-fluorescent specimens, such as carbon nanotubes. In certain embodiments, the fluorescent material 501 deposited onto the backplane 100 of the SIL 103 may be fluorescent microspheres. Such microspheres may capture the transmitted excitation and emit fluorescent radiation. Additionally, in certain embodiments, the pinhole in the LSM may set fully open to accept all emitted electromagnetic radiation (including secondarily scattered electromagnetic radiation).

In some embodiments, fluorescence emission is detected by mounting a detector 503 following the specimen of interest 102. This contrasts with conventional confocal microscopes, in which the fluorescence emission is collected by the objective lens 502 and propagates through the microscope column. In certain embodiments, the detector 503 immediately following the specimen of interest 102 is used to directly detect the transmitted electromagnetic radiation obviating the need for fluorescence labeling or any fluorescent material to be deposited onto the backplane. This may improve signal strength, since the efficiency of the fluorescence process is generally quite low. The limitation imposed by the bleaching of the fluorophores is also removed, and high signal statistics become available for images with minimized graininess (e.g. high signal-to-noise ration images can be achieved). In certain embodiments, the detector 503 detects transmitted infrared light, which then may be converted to a visible image. The described method, therefore, is highly promising for a wide range of applications in biological sciences, medical diagnosis, and nanotechnology.

In certain embodiments, fiducial markings (e.g. used as, for example, focusing references, size references, coordinate systems, etc.) corresponding to bumps 102 or recesses 101 are introduced on the backplane 100 of the SIL. For example, referring to FIG. 2, the recess 101 shown on the backplane 100 of the SIL may represent the cross-section of a fine channel (e.g. a micro-scale trench or a nanoscale-trench) which runs along the length of the backplane. Similarly, referring to FIG. 3, the bump 102 may represent the cross section of a deposited line which runs along the length of the backplane. These bumps or recesses can be etched or deposited fine features, as illustrated in FIG. 6. More lines with close spacing may make the markings more brightly visible. In certain embodiments lines that are not continuous (e.g. dotted lines) are used.

In certain embodiments, methods including electron-beam lithography or focused ion-beam milling, are used to etch or deposit the lines. In some embodiments, a patterned organic layer can be suitably carbonized using, for example, laser-ablation or irradiation by electrons or ions. In some embodiments, carbon tracks are formed by an electron-beam, ion bombardment, or laser ablation. In some embodiments, carbon tracks are deposited from organic vapors and patterned with electron-, ion-, or laser-beam writing.

Similarly, in certain embodiments, patterned deposition of nanoparticles is used for fiducial marking. FIG. 7 illustrates densely populated nanoparticles. Various nanoparticles may be utilized (e.g. nanoparticles such as glass beads, plastic beads, gold nanoparticles, and/or quantum dots such as ZnSe quantum dots and CdSe quantum dots). In certain embodiments, carbon nanoparticles are deposited with laser ablation in a maskless writing system.

Figure 8:
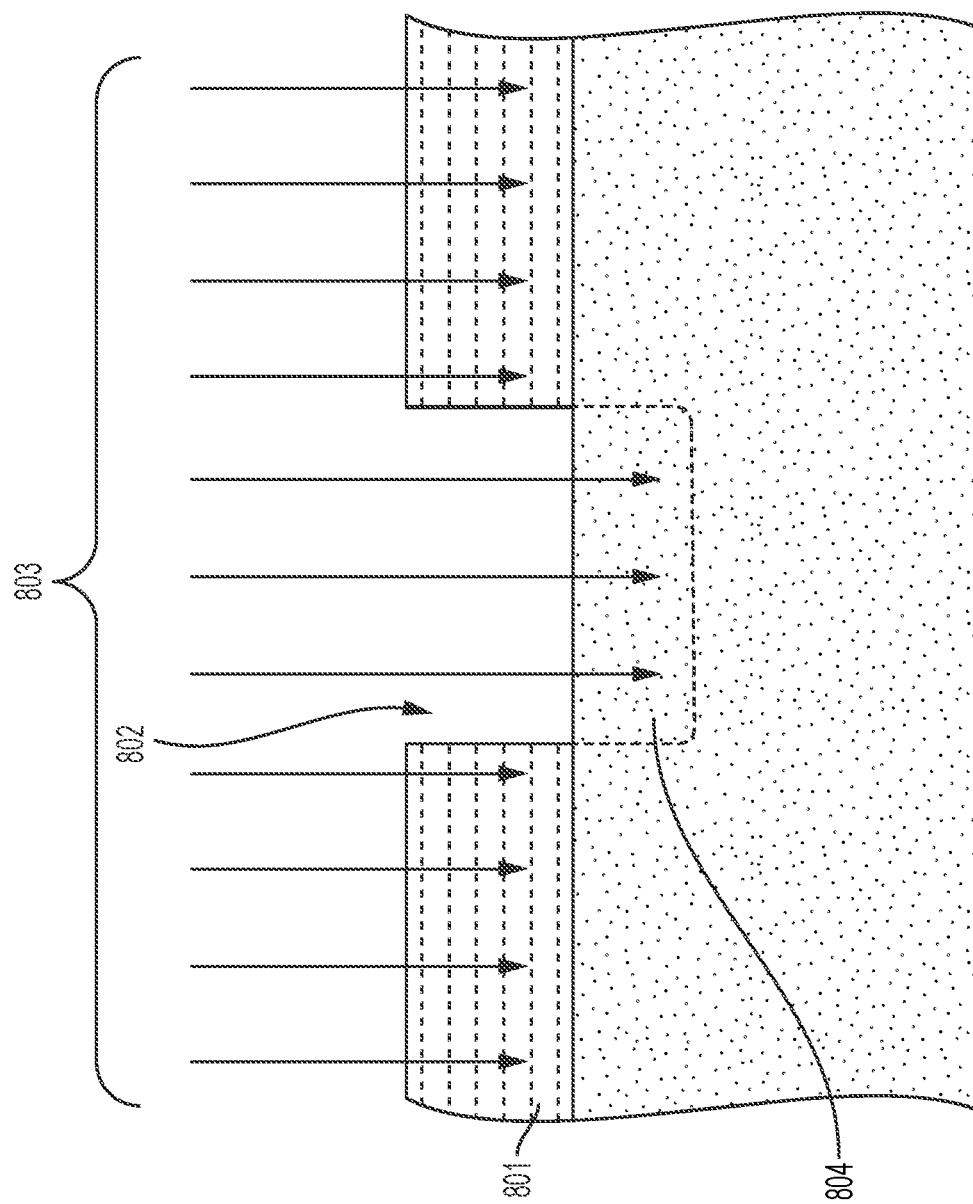
FIG. 8 is a schematic showing fiducial markings made with ion implantation according to an illustrative embodiment.

In another embodiment, fiducial marking is achieved through high-dose ion implantation. Methods for implantation of ions of inert gases can induce microscopic disorder, stress, or formation of bubbles or blisters near the surface. The presence of these types of surface features in the backplane 100 of the SIL can aid in electromagnetic radiation transmission, similar to the recesses and bumps. In particular, in certain embodiments, high-dose ion implantation can be used to induce cavities (e.g. bubbles) near the surface. In certain embodiments, fiducial markings are patterned using methods such as photo-lithography or electron-beam lithography. As illustrated in FIG. 8, a resist 801 is used to shield regions not intended for the fiducial marking, and the opening 802 between the shielded areas is bombarded by ions 803 to yield the marking region 804. In certain embodiments, use of one mask can allow simultaneous patterning of many (e.g. more than 20, e.g. more than 100, e.g. more than 500) separate lenses.

Figure 9:
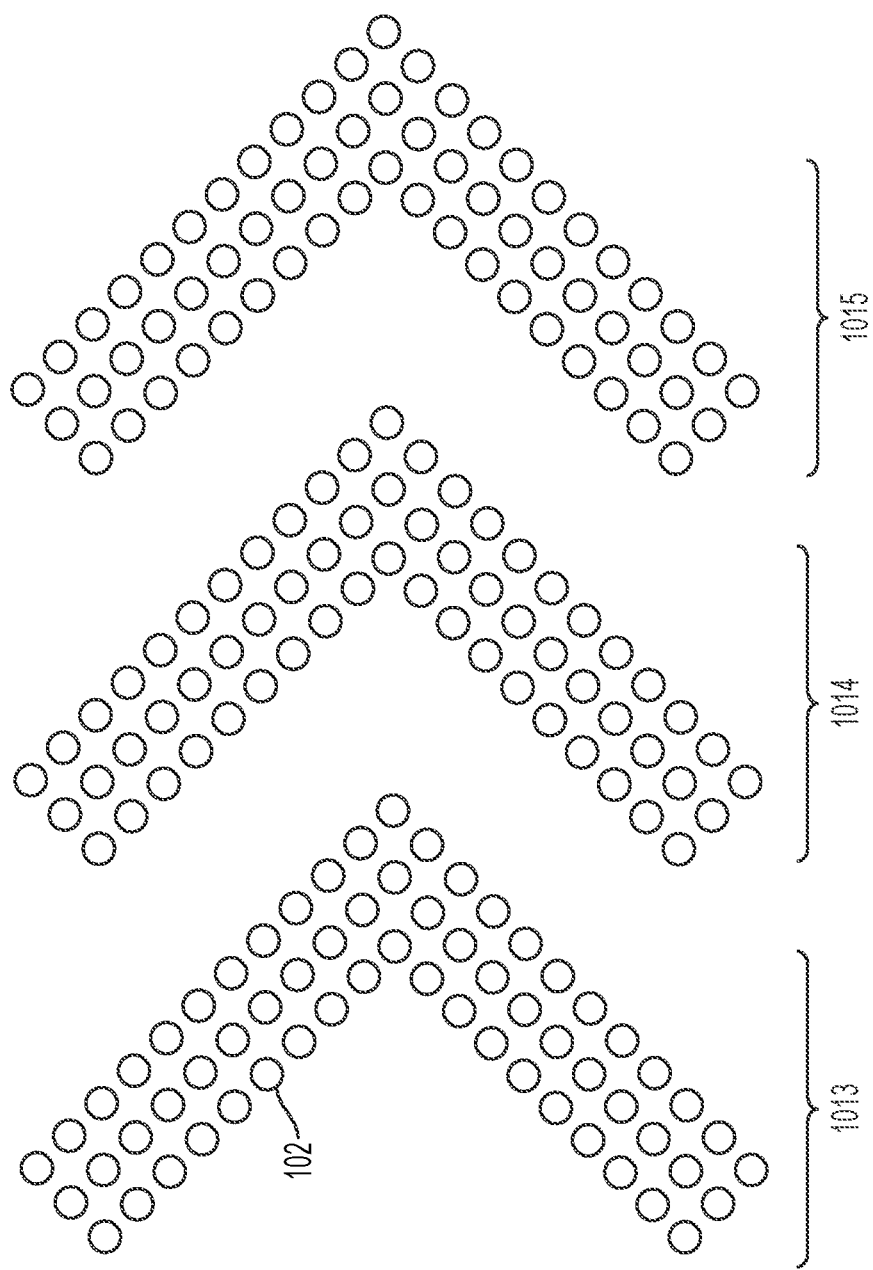
FIG. 9 is a schematic showing focusing references made of nanoparticles deposited on the backplane of the SIL according to an illustrative embodiment.
Figure 10:
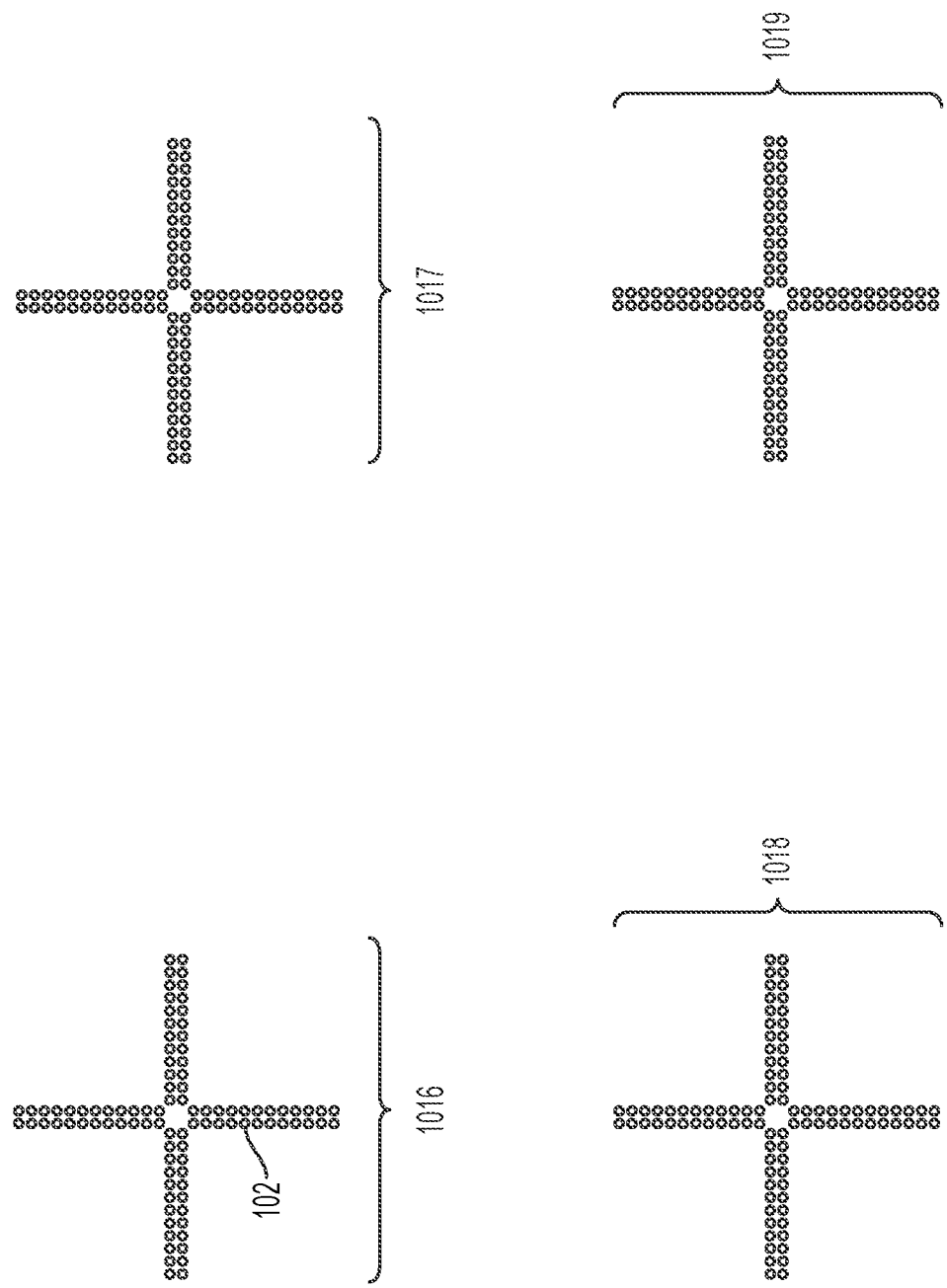
FIG. 10 is a schematic showing coordinate and scale markers made of nanoparticles deposited on the backplane of the SIL according to an illustrative embodiment.

The described techniques for incorporating fiducial markings into the backplane 100 of the SIL may be used to realize various types of fiducial markings, including, for example, a focusing marker, coordinates and scale references, and alphanumeric address labelling, as shown in FIG. 9, FIG. 10, and FIG. 11, respectively.

Figure 12:
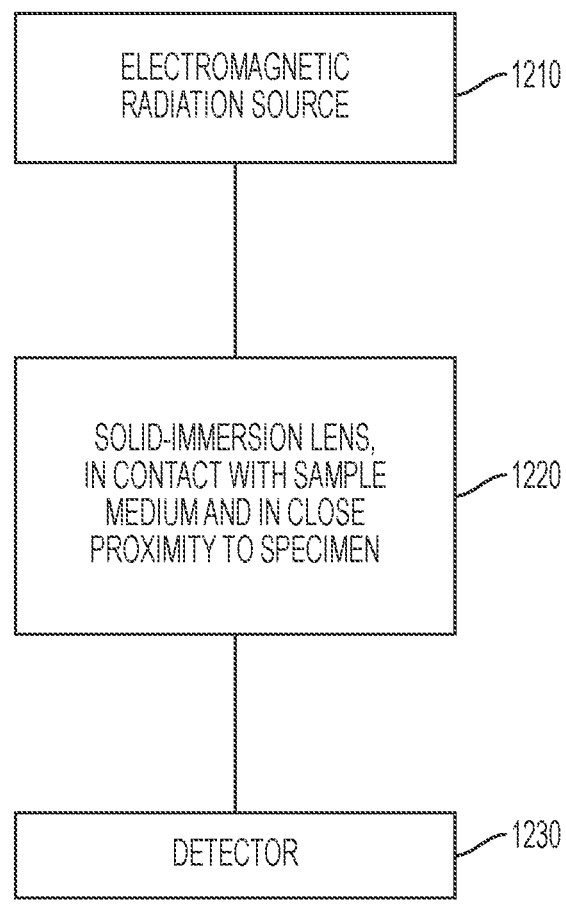
FIG. 12 is a block diagram illustrating the components of a system utilizing a SIL to image a specimen contained in a sample medium using electromagnetic radiation and an appropriate detector according to an illustrative embodiment.

FIG. 12 is a block diagram of a system for imaging a specimen that comprises an electromagnetic radiation source 1210, a SIL in contact with a sample medium and in close proximity with a specimen 1220, and a detector 1230. In certain embodiments, the system forms an image by directing electromagnetic radiation through the top surface (e.g. the convex portion of the SIL), towards the planar SIL backplane and the specimen. The electromagnetic radiation propagates through the SIL and forms a focus at or near the SIL backplane, thereby illuminating a feature of interest of the specimen that is positioned in close proximity to the SIL backplane, and within the focus. The feature of interest may interact with the focused electromagnetic radiation as described herein, and electromagnetic radiation that is either directly scattered (e.g. electromagnetic radiation that is not converted to a different wavelength) or produced by fluorescence is detected. Typically, the detected electromagnetic radiation produces a signal (e.g. an electronic signal such as a voltage or current) whose value is a function of the strength (e.g. a power) of the electromagnetic radiation that is received by the detector.

In certain embodiments, in order to produce a full image of a specimen, the position of the focus is raster scanned in a plane that is substantially parallel to the SIL backplane, thereby illuminating a plurality of spatial regions within the specimen and sample medium corresponding to different positions of the focus. Different regions in the specimen, corresponding to different features may have different refractive index values. Accordingly, the strength of the electromagnetic radiation received by the detector will vary according the position of the focus, based on the particular features of the specimen that the focus illuminates and their corresponding refractive index. For each point corresponding to a different position of the focus, the value of the detector signal is recorded and processed to derive a value of a pixel in an image, wherein the position of the pixel in the image is based on the position of the focus that produced the corresponding signal.

In this manner, an image can be formed using any detectable wavelength of electromagnetic radiation. For example, in certain embodiments the source of electromagnetic radiation is an infrared source that produces infrared light and the detector is an infrared detector. An image can be produced in the manner described herein in order to form a visible image (e.g. on a computer screen) based on the detected infrared light.

CONSTRUCTIVE EXAMPLES

In certain embodiments, utilizing locally high index of refraction of microscopic objects is thought to provide for nanometer and sub-nanometer super-resolution ("ultra-resolution") microscopy using high-index solid-immersion lenses. Refractive index originates from an atomic molecular polarization induced by the electric field in an electromagnetic wave (e.g. the light). In a microscopy specimen, the presence of some objects can lead to regions of high polarization. The presence of such objects leads to high effective local refractive index. In the following constructive examples (Example 1, Example 2, and Example 3), it is thought that certain specimens can be imaged at ultra-high super resolution (ultra-resolution) using various embodiments of methods described herein.

Example 1

In biological specimens stained for contrast or for fluorescence, the high absorption of the stain leads to a high refractive index due to the dispersive nature of the refractive index about an absorption band.

Example 2

Large molecules with compact chemical bonding, such as DNA or carbon nanotubes, feature high concentrations of atoms. Such high concentrations of atoms lead to high polarization in a localized region surrounding the high atomic concentration.

Example 3

A membrane sheet can be imaged in a direction parallel to the direction of electromagnetic radiation propagation. The geometrical shape of an object (e.g. a membrane sheet) can lead to an effective high local polarization, which may allow ultra-resolution imaging of the object using certain embodiments of the methods described herein. A polarization induced in molecules present in the membrane sheet sums to create an effective local high index of refraction. In certain embodiments of the methods described herein, vesicles may appear as bright circles. It is thought that vesicles may be imaged with apparent diameters of around 100 nm.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of imaging a specimen containing features of interest using an annular solid immersion lens (ASIL), the method comprising the steps of:
   (a) directing scanned electromagnetic radiation (emr) to the ASIL, wherein:
      the ASIL comprises a first surface comprising a convex region, and a second surface that is substantially planar and comprising fiducial markings having been fabricated by nanoparticle deposition;
      (ii) at least a portion of the scanned emr is transmitted through the convex region of the first surface of the ASIL, and propagates inside the ASIL toward the second surface;
      (iii) the portion of the scanned emr transmitted through the convex region forms a focus near and/or on the second surface of the ASIL; and
      (iv) the second surface of the ASIL is in contact with a sample medium having a refractive index that is lower than the refractive index of the ASIL;
   (b) positioning the specimen containing features of interest within the sample medium in close proximity to the second surface of the ASIL, wherein the specimen containing features of interest has a refractive index that is higher than that of material immediately surrounding the features of interest, and wherein the specimen features of interest are aligned with the focus so that the scanned emr rays become normally incident onto the specimen features of interest at times during the scan;
   (c) detecting fluorescent light that is emitted by at least one of (i) the features of interest itself, or (ii) one or more secondary fluorescent objects within the sample medium; and
   (d) constructing an image from the detected fluorescent light that resolves specimen features that are less than 100 nm.

2. The method of claim 1, wherein the ASIL has a refractive index greater than 3.

3. The method of claim 1, wherein the second surface of the ASIL comprises one or more fiducial markings having been fabricated by nanoparticle deposition of gold nanoparticles.

4. The method of claim 1, comprising:
   directing emr to the ASIL using a laser scanning microscope (LSM); and constructing the image of the specimen using the LSM.

5. The method of claim 1, wherein the fiducial markings having been fabricated by deposition comprise tracks of nanoparticles.

6. The method of claim 1, wherein the fiducial markings having been fabricated by deposition comprise glass nanoparticles.

7. The method of claim 1, wherein the fiducial markings having been fabricated by deposition comprise glass quantum dots.

8. The method of claim 1, wherein the fiducial markings having been fabricated by deposition comprising carbon nanoparticles.

9. The method of claim 1, further comprising generating the electromagnetic radiation (emr) using a Scanning Confocal Microscope (SCM) source.

10. The method of claim 1, further comprising generating the electromagnetic radiation (emr) using a Laser Scanning Microscope (LSM) source.

11. The method of claim 1, wherein the directing the scanned electromagnetic radiation (emr) to the ASIL comprises directing raster scanned electromagnetic radiation.

12. The method of claim 1, wherein the one or more secondary fluorescent objects within the sample medium are excited by excitation light that is transmitted into the sample medium.

13. The method of claim 1, wherein fluorescent light that is emitted by at least one of (i) the feature of interest itself, and (ii) the one or more secondary fluorescent objects within the sample medium is detected by a detector following the sample medium.

14. The method of claim 1, wherein fluorescent light that is emitted by at least one of (i) the feature of interest itself, and (ii) the one or more secondary fluorescent objects within the sample medium is transmitted from the sample medium into the ASIL, and detected after it propagates inside the ASIL and is transmitted through the first surface of the ASIL.

15. The method of claim 1, wherein the feature of interest forms a local high-index region in close proximity to, and/or in contact with, the second surface of the ASIL, thereby acting as a source of a spherical wave with a well-defined center, including the case wherein the center is a dimensionless point.

16. The method of claim 1, wherein the specimen is a biological or bio-molecular specimen.

17. The method of claim 1, wherein:
   the emr is light incident onto the SIL, the emr is detected using a detector that converts the detected emr into a signal having a value that is a function of an intensity of the detected emr, and the method comprises displaying the value of the signal for visualization.

18. The method of claim 1, wherein the sample medium is a medium selected from the group consisting of air, water, organic material, and a biological media.

19. The method of claim 1, comprising detecting fluorescent light that is transmitted through the sample medium and/or specimen, away from the second surface of the ASIL.

20. A method of imaging a specimen containing features of interest using an annular solid immersion lens (ASIL), the method comprising the steps of:
   (a) directing scanned electromagnetic radiation (emr) to the ASIL, wherein:
      (i) the ASIL comprises a first surface comprising a convex region, and a second surface that is substantially planar and comprising fiducial markings fabricated by ion bombardment;
(ii) at least a portion of the scanned emr is transmitted through the convex region of the first surface of the ASIL, and propagates inside the ASIL toward the second surface;
(iii) the portion of the scanned emr transmitted through the convex region forms a focus near and/or on the second surface of the ASIL; and
(iv) the second surface of the ASIL is in contact with a sample medium having a refractive index that is lower than the refractive index of the ASIL;

(b) positioning the specimen containing features of interest within the sample medium in close proximity to the second surface of the ASIL, wherein the specimen containing features of interest has a refractive index that is higher than that of material immediately surrounding the features of interest, and wherein the specimen features of interest are aligned with the focus so that the scanned emr rays become normally incident onto the specimen features of interest at times during the scan;

(c) detecting fluorescent light that is emitted by at least one of (i) the features of interest itself, or (ii) one or more secondary fluorescent objects within the sample medium; and (d) constructing an image from the detected fluorescent light that resolves specimen features that are less than 100 nm.

* * * * *